(12) United States Patent
Kinme et al.

(10) Patent No.: US 7,168,741 B2
(45) Date of Patent: Jan. 30, 2007

(54) STEERING APPARATUS

(75) Inventors: Shigetaka Kinme, Kashihara (JP); Kenichi Aota, Nara (JP); Yasunori Takeda, Ikoma (JP); Satoshi Kinoshita, Kozakai-Cho (JP)

(73) Assignees: Koyo Seiko Co., Ltd, Osaka (JP); Fujikiko Kabushiki Kaisha, Kosa (JP)

( * ) Notice: Subject to any disclaimer, the term of this patent is extended or adjusted under 35 U.S.C. 154(b) by 317 days.

(21) Appl. No.: 10/723,071

(22) Filed: Nov. 25, 2003

(65) Prior Publication Data

US 2004/0104567 A1 Jun. 3, 2004

(30) Foreign Application Priority Data

Nov. 28, 2002 (JP) .............................. 2002-346318

(51) Int. Cl.
*B62D 1/19* (2006.01)
*B62D 1/18* (2006.01)

(52) U.S. Cl. ....................... 280/777; 74/493
(58) Field of Classification Search ............... 280/777; 74/492, 493
See application file for complete search history.

(56) References Cited

U.S. PATENT DOCUMENTS

| | | | | |
|---|---|---|---|---|
| 3,590,655 A | * | 7/1971 | Farrell et al. ................ | 74/492 |
| 3,703,105 A | * | 11/1972 | Milton et al. ................ | 74/492 |
| 3,788,148 A | * | 1/1974 | Connell et al. .............. | 74/492 |
| 3,877,319 A | * | 4/1975 | Cooper ....................... | 74/492 |
| 4,805,478 A | * | 2/1989 | Beauch ....................... | 74/492 |
| 5,314,204 A | * | 5/1994 | DuRocher et al. ........... | 280/777 |
| 5,722,300 A | * | 3/1998 | Burkhard et al. ............ | 74/493 |
| 5,758,545 A | * | 6/1998 | Fevre et al. ................. | 74/493 |
| 6,109,652 A | * | 8/2000 | Kim et al. ................... | 280/777 |

FOREIGN PATENT DOCUMENTS

| | | | |
|---|---|---|---|
| EP | 0713 820 | * | 11/1995 |
| JP | 08-142877 | | 6/1996 |
| JP | 09-095245 | | 4/1997 |
| JP | 10-076958 | | 3/1998 |
| JP | 2000-219139 | | 8/2000 |
| WO | WO-99/03716 A1 | | 1/1999 |

OTHER PUBLICATIONS

Patent Abstracts of Japan, vol. 1998, No. 8, Jun. 30, 1998, JP 10-076958 (Nippon Seiko KK).

* cited by examiner

*Primary Examiner*—Paul N. Dickson
*Assistant Examiner*—George D. Spisich
(74) *Attorney, Agent, or Firm*—Darby & Darby (57) ABSTRACT

A first housing rotatably supports a steering shaft having an end portion coupled to a steering wheel. A second housing engages with the first housing via two impact energy absorbing rings separate from each other in the axial direction. The first housing and the second housing are relatively movable in the axial direction. One of the first housing and the second housing has first and second impact energy absorbing protrusions projected from positions between the impact energy absorbing rings separately in the axial direction so as to contact with the circumferential surface of the other of the first housing and the second housing. The impact energy absorbing protrusions therefore reduce the load applied to the impact energy absorbing rings in usual steering. Further, the impact energy absorbing rings reduce the load due to frictional resistance in impact energy absorption.

8 Claims, 7 Drawing Sheets

STEERING APPARATUS

BACKGROUND OF THE INVENTION

1. Field of the Invention

The present invention relates to a steering apparatus of impact energy absorbing type, which is designed to absorb impact energy applied to steering means, such as a steering wheel, from the driver when a car makes a crash or the like.

2. Description of Related Art

A steering apparatus of impact energy absorbing type comprises: an upper housing for rotatably supporting a steering shaft having an upper portion coupled to a steering wheel via an antifriction bearing; a lower housing which is inserted into the upper housing so as to be relatively movable in the axial direction and is fixed to the car body; and first and second impact energy absorbing protrusions which are projected in one body from a lower portion of the upper housing separately from each other in the axial direction so as to contact with the inner circumferential surface of the lower housing, for example.

Impact energy caused by a secondary crash, which is applied to a steering wheel when a car makes a frontal crash or the like, is transmitted through the antifriction bearing to the upper housing, so that the upper housing moves in the axial direction with respect to the lower housing. While the upper housing moves, the impact energy is absorbed by frictional resistance generated between the impact energy absorbing protrusions and the lower housing.

However, since impact energy caused by the secondary crash is applied to the steering shaft in a direction inclined with respect to the axis of the steering shaft, bending moment arises at the upper housing which supports the steering shaft. This bending moment causes the upper housing to be inclined with respect to the lower housing, so that the lower end of the upper housing comes into contact with the outer circumferential surface of the lower housing and the upper end of the lower housing comes into contact with the inner circumferential surface of the upper housing, thereby applying load due to frictional resistance to these two contact parts. As a result, movement resistance of the upper housing increases and load applied to the driver also increases.

The load applied to the driver can be reduced by lengthening the distance between the first impact energy absorbing protrusion and the second impact energy absorbing protrusion so as to reduce the above-mentioned load due to frictional resistance applied to the two contact parts. It is, however, impossible to lengthen the distance between the two impact energy absorbing protrusions since the movement amount of the upper housing, i.e. the energy absorption stroke, is inevitably determined by the layout of the vehicle.

Another steering apparatus widely known is a steering apparatus of impact energy absorbing type disclosed in Japanese Patent Application Laid-Open No. H10-76958 (1998), for example, in which a lower housing is engaged with an upper housing for rotatably supporting a steering shaft having an upper portion coupled to a steering wheel via two impact energy absorbing rings made of synthetic resin disposed separately from each other in the axial direction so as to be relatively movable in the axial direction.

The steering apparatus disclosed in Japanese Patent Application Laid-Open No. H10-76958 absorbs impact energy in a state where the circumferential surface of the impact energy absorbing rings are in contact with the circumferential surface of the upper housing and the lower housing. As a result, the load due to frictional resistance can be reduced and the movement resistance of the upper housing can be reduced in comparison with a steering apparatus having impact energy absorbing protrusions. However, since the upper housing receives bending moment corresponding to steering force in usual steering as well as bending moment in impact energy absorption, heavy load is applied to the impact energy absorbing rings. Consequently, there has been a demand for improvement in durability of the impact energy absorbing rings.

BRIEF SUMMARY OF THE INVENTION

The present invention has been made with the aim of solving the above problems, and it is a main object thereof to provide a steering apparatus which can reduce the load applied on the impact energy absorbing rings in usual steering and reduce the load due to frictional resistance in impact energy absorption.

A steering apparatus according to the present invention is constructed by engaging a second housing with a first housing, which rotatably supports a steering shaft having one end coupled to steering means, via two impact energy absorbing rings disposed separately from each other in the axial direction so as to be relatively movable in the axial direction. In this steering apparatus, one of the first housing and the second housing has first and second impact energy absorbing protrusions which are projected from positions between the impact energy absorbing rings separately from each other in the axial direction and contact with the circumferential surface of the other of the first housing and the second housing.

This steering apparatus can absorb the impact energy caused by a secondary crash in a state where the circumferential surface of the impact energy absorbing rings are in contact with the circumferential surfaces of the first housing and the second housing and the impact energy absorbing protrusions are in contact with the circumferential surface of the first housing or the second housing, thereby reducing the load due to frictional resistance in impact energy absorption. Moreover, since bending moment applied to the first housing in usual steering can be applied in a divided manner to the impact energy absorbing rings and the impact energy absorbing protrusions, the load applied to the impact energy absorbing rings in usual steering can be reduced and the durability of the impact energy absorbing rings can be improved.

The steering apparatus according to the present invention may comprise: a plurality of first impact energy absorbing protrusions arranged separately from each other in the circumferential direction; and a plurality of second impact energy absorbing protrusions arranged separately from each other in the circumferential direction. Moreover, one of the impact energy absorbing rings may have: a ring portion to contact with an end face of the first housing or the second housing; and a plurality of plate pieces disposed continuously with the ring portion separately from each other in the circumferential direction at intervals corresponding to the impact energy absorbing protrusions.

In this steering apparatus, the space between the plate pieces of an impact energy absorbing ring can be used as a non-contact pathway which does not contact with the impact energy absorbing protrusions. The first housing therefore can be inserted into the second housing in a state where the two impact energy absorbing rings are engaged with and retained on the circumferential surface of the first housing or the second housing without prevention by the impact energy absorbing rings, thereby making the assembling operation easier.

In the steering apparatus according to the present invention, the external diameter of a portion of the ring portion where no plate piece is provided may be equal to or smaller than the external diameter of the second housing an end of which is to contact with the ring portion.

Moreover, in the steering apparatus according to the present invention, the internal diameter of a portion of the ring portion where no plate piece is provided may be equal to or larger than the internal diameter of the first housing an end face of which is to contact with the ring portion.

This steering apparatus can more reliably eliminate the prevention by the impact energy absorbing rings in inserting the first housing into the second housing, thereby making the assembling operation easier.

In the steering apparatus according to the present invention, the plate pieces may have such a length that the plate pieces pass the axial position of one of the first and second impact energy absorbing protrusions.

This steering apparatus, in which the contact area between the first housing and the second housing is increased, can absorb the impact energy more preferably and reduce the load due to frictional resistance in impact energy absorption.

In the steering apparatus according to the present invention, an impact energy absorbing ring which does not have the ring portion and the plate pieces may have: a ring portion arranged between the first housing and the second housing; an edge portion formed continuously with an end of the ring portion to project outwardly or inwardly so as to contact with an end face of one of the first housing and the second housing; and a plurality of plate pieces projected from an end of the ring portion opposite to the edge portion separately from each other in the circumferential direction at intervals corresponding to the impact energy absorbing protrusions This steering apparatus, in which the contact area between the first housing and the second housing is increased, can absorb the impact energy more preferably and reduce the load due to frictional resistance in impact energy absorption.

The above and further objects and features of the invention will more fully be apparent from the following detailed description with accompanying drawings.

DETAILED DESCRIPTION OF THE INVENTION

The following description will explain the present invention in detail with reference to the drawings illustrating an embodiment thereof.

Figure 1:
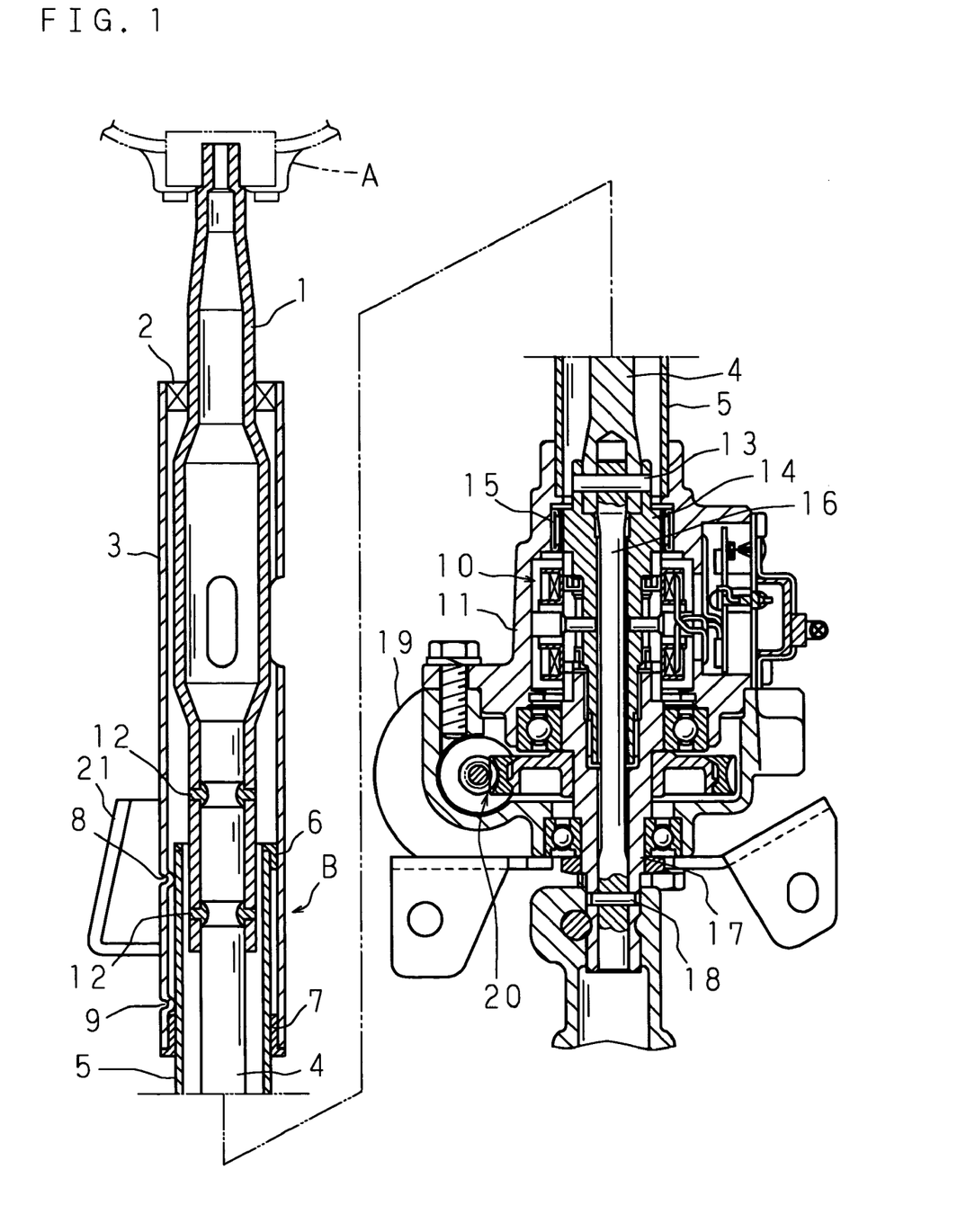
FIG. 1 is a sectional view showing the structure of a steering apparatus according to the present invention.

FIG. 1 is a sectional view showing the structure of a steering apparatus according to the present invention.

The steering apparatus comprises a first shaft 1 having an end portion coupled to a steering wheel for steering (steering means) A, a cylindrical first housing 3 which surrounds the first shaft 1 and rotatably supports the first shaft 1 via a ball bearing 2, a second shaft 4 engaged with the other end portion of the first shaft 1 so as to be relatively movable in the axial direction a second housing 5 which surrounds the second shaft 4 and has an end portion engaged with the other end portion of the first housing 3, first and second impact energy absorbing rings 6 and 7 made of synthetic resin, which are engaged with and retained at an engagement portion B of the first housing 3 and the second housing 5 separately from each other in the axial direction, first and second impact energy absorbing protrusions 8 and 9 projected from positions between the impact energy absorbing rings 6 and 7 in one body with the fist housing 3, a torque sensor 10 arranged at the other end side of the second shaft 4 and the second housing 5, and a supporting member 11 for supporting the torque sensor 10. The first shaft 1 and the second shaft 4 compose a steering shaft.

The first shaft 1 is formed cylindrically. An end portion of the first shaft 1 is rotatably supported on the inner circumferential surface of an end portion of the first housing 3 via the ball bearing 2 while the other end portion of the first shaft 1 is engaged with an end portion of the rod-shaped second shaft 4 so as not to be relatively rotatable but to be movable in the axial direction. Provided at the engagement portion is an impact energy absorbing member 12 made of synthetic resin, for example, which is to be destroyed by the impact energy caused by a secondary crash so as to absorb the impact energy together with the impact energy absorbing rings 6 and 7 and the impact energy absorbing protrusions 8 and 9.

The second shaft 4 is rotatably supported in the supporting member 11 via a sensor supporting cylinder 14 connected with the other end portion of the second shaft 4 by a dowel pin 13 and a bearing 15 engaged with the sensor supporting cylinder 14. An end portion of a torsion bar 16, which is inserted into the sensor supporting cylinder 14 to be twisted by the action of steering torque applied to the steering wheel A, is connected with the other end portion of the second shaft 4 by the dowel pin 13. The other end portion of the torsion bar 16 is connected with a transmission shaft 17 by a dowel pin 18.

The inner diameter of the first housing 3 is larger than the outer diameter of the second housing 5. The impact energy absorbing rings 6 and 7 are engaged with an engagement portion between the inner circumferential surface of the other end portion 3a (see FIG. 2) of the first housing 3 and the outer circumferential surface of one end portion 5a (see FIG. 2) of the second housing 5, so that the first housing 3 can be movable in the axial direction with respect to the second housing 5 via the impact energy absorbing rings 6 and 7.

The torque sensor 10 detects a steering torque applied to the steering wheel A on the basis of a relative rotational displacement amount of the second shaft 4 and the transmission shaft 17 caused by the twist of the torsion bar 16. A steering assist motor 19 is driven in a controlled manner on the basis of the torque detected by the torque sensor 10 or the like. A motor 19 is attached to the outside of the supporting member 11, so that the rotation of the motor 19 is transmitted to the transmission shaft 17 via a reduction gear mechanism 20. The transmission shaft 17 is connected with a rack-and-pinion steering mechanism via a universal joint.

Figure 2:
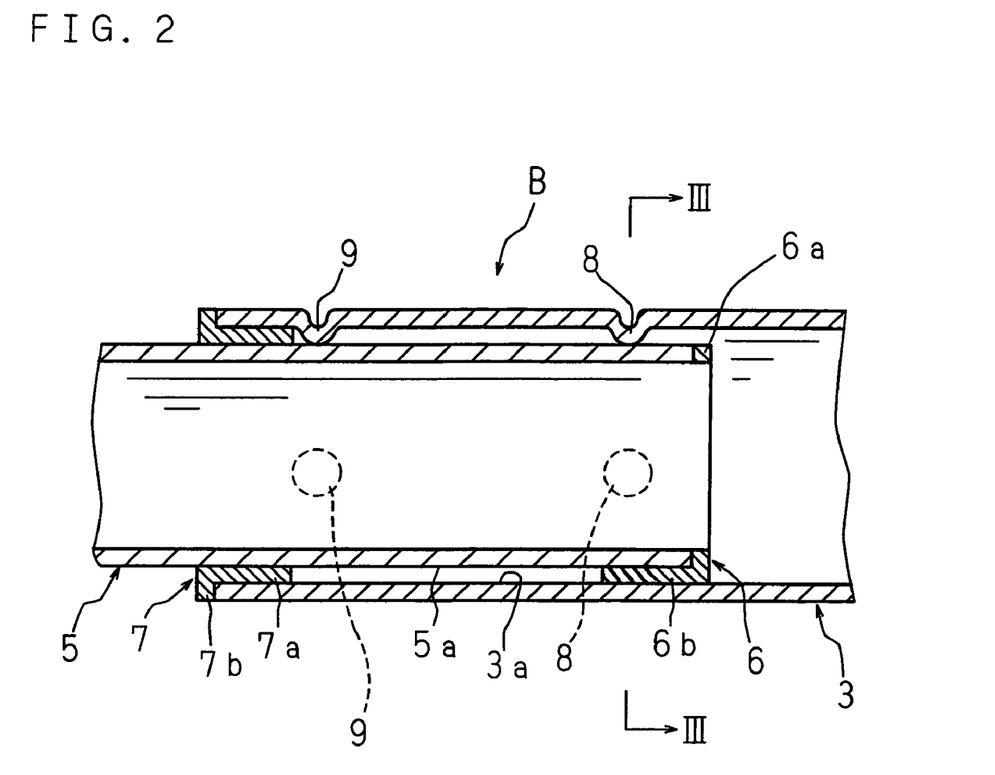
FIG. 2 is an enlarged sectional view of an engagement portion of a first housing and a second housing of the steering apparatus according to the present invention.
Figure 3:
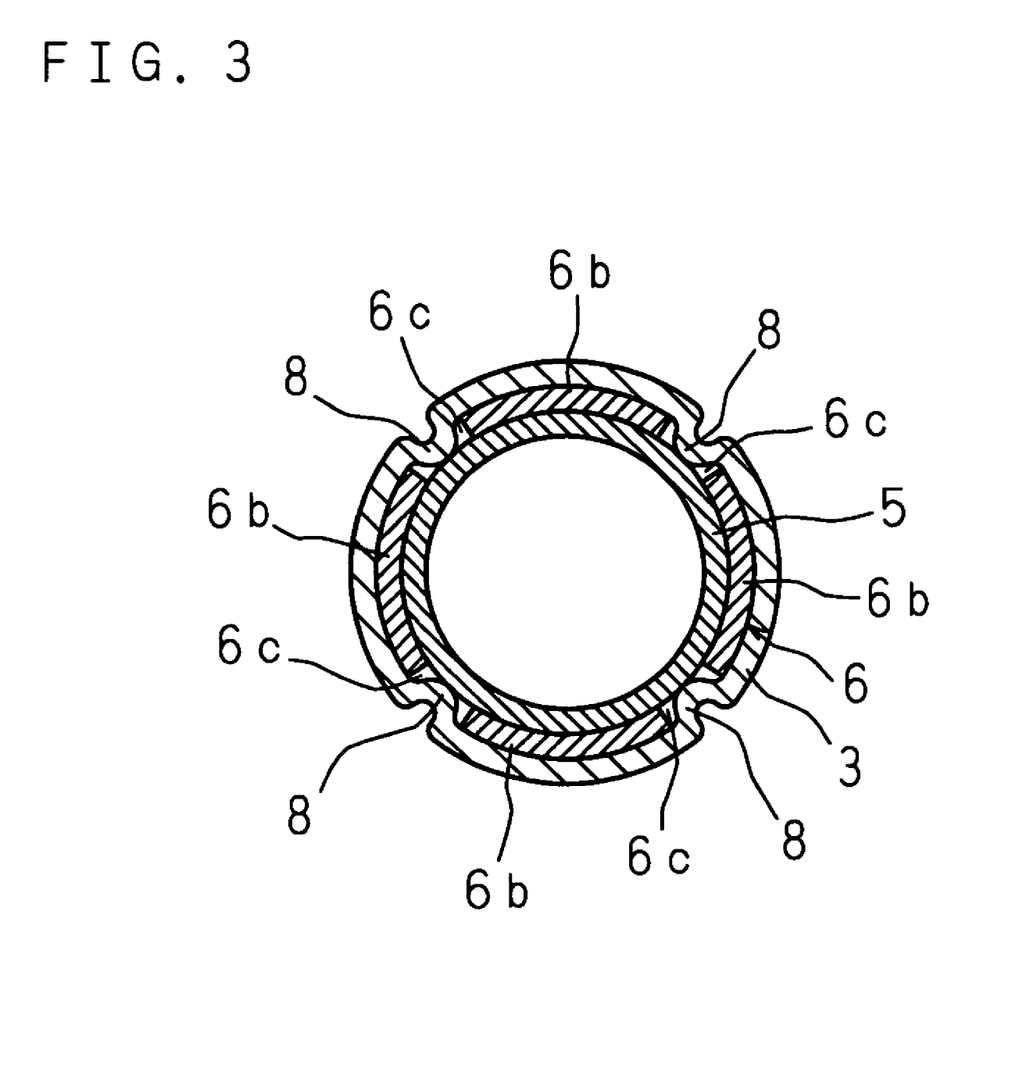
FIG. 3 is a cross-sectional representation of the first housing and second housing of the steering apparatus shown view taken along the line III—III in FIG. 2.
Figure 4:
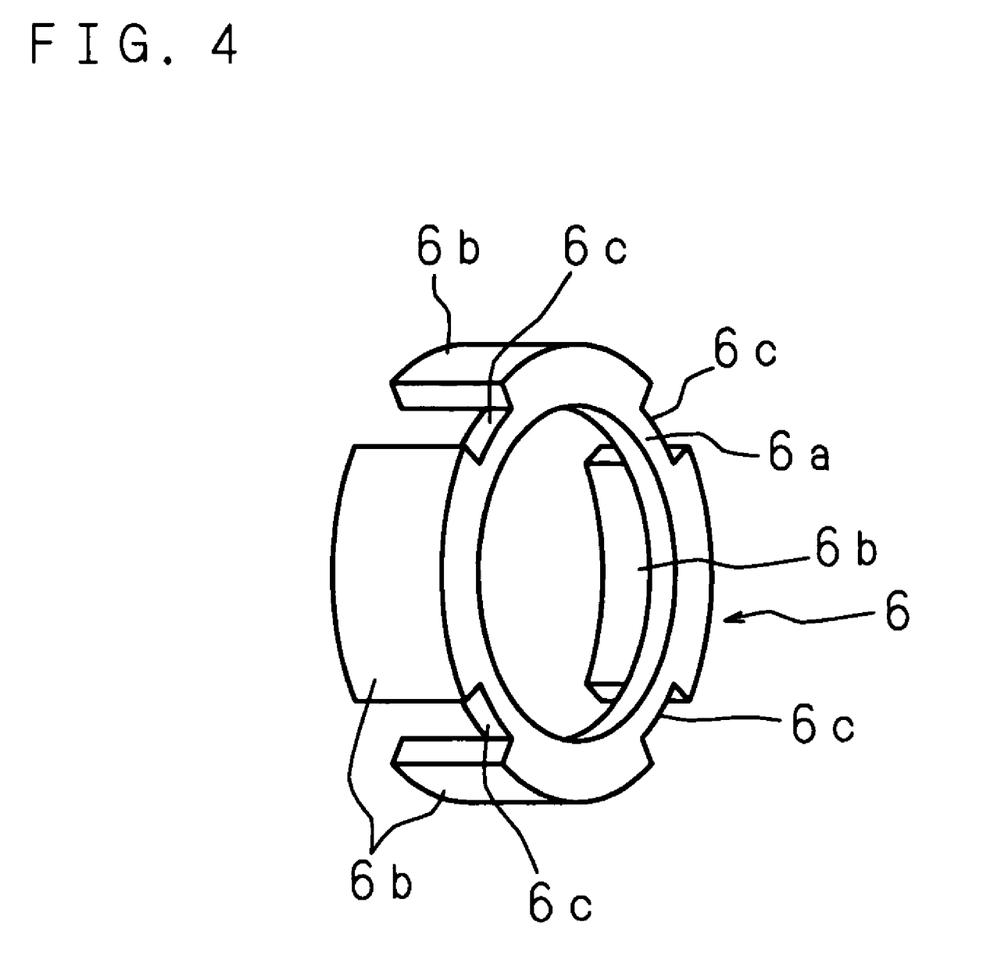
FIG. 4 is a perspective view showing the structure of a first impact energy absorbing ring of the steering apparatus according to the present invention.
Figure 5:
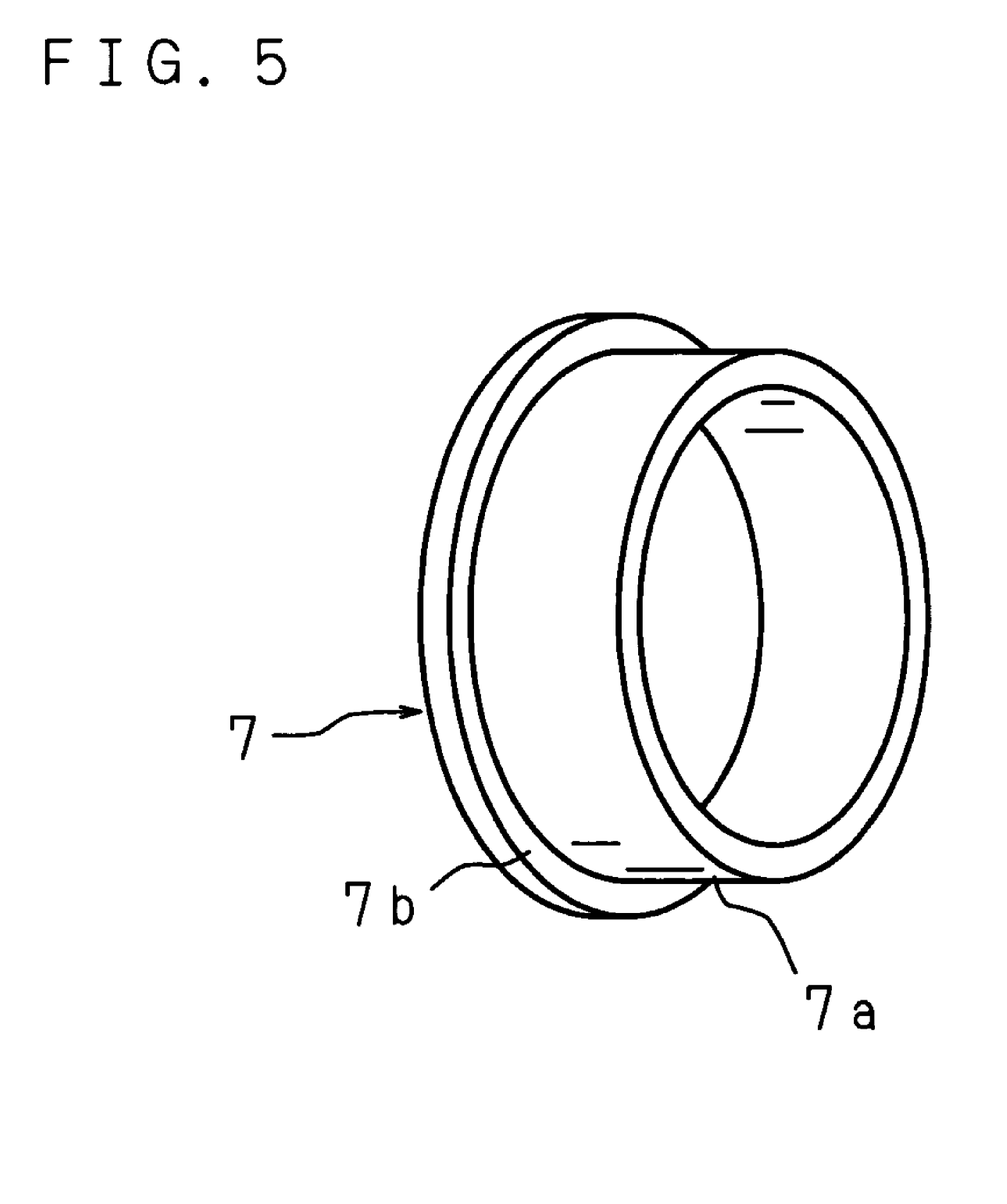
FIG. 5 is a perspective view showing the structure of a second impact energy absorbing ring of the steering apparatus according to the present invention.

FIG. 2 is an enlarged sectional view of an engagement portion of the first housing and the second housing, FIG. 3 is a sectional view taken along the line III—III in FIG. 2, FIG. 4 is a perspective view showing the structure of the first impact energy absorbing ring, and FIG. 5 is a perspective view showing the structure of the second impact energy absorbing ring.

Each of the first and second impact energy absorbing protrusions 8 and 9 is composed of four projections, for example, formed in one body at the proximity of the impact energy absorbing rings 6 and 7 separately from each other in the circumferential direction. The first and second impact energy absorbing protrusions 8 and 9 are arranged in axial positions separated from each other and in circumferential positions approximately according with each other. It should be noted that the first and second impact energy absorbing protrusions 8 and 9 are formed by pressing the engagement portion of the first housing 3 inwardly in the radial direction with a forming tool which is mounted at a piston rod of a hydraulic cylinder, for example. It should be also noted that the shape and the number of the impact energy absorbing protrusions 8 and 9 are not particularly limited.

The first impact energy absorbing ring 6 has: a ring portion 6a to contact with an end face of the second housing 5; and four plate pieces 6b formed continuously with an outer circumferential portion of the ring portion 6a at positions separated from each other in the circumferential direction. The plate pieces 6b are disposed separately from each other in the circumferential direction at regular intervals corresponding to the first and second impact energy absorbing protrusions 8 and 9. The external diameter of a portion of the ring portion 6a where none of the plate pieces 6b is provided is equal to or smaller than the external diameter of the other end portion of the second housing 5. The space between the plate pieces 6b of the ring portion 6a is defined as non-contact pathways 6c which do not contact with the first and second impact energy absorbing protrusions 8 and 9. It should be noted that the shape of the first impact energy absorbing ring 6 and the number of the plate pieces are not particularly limited.

The second impact energy absorbing ring 7 has: a ring portion 7a engaged with and retained on the inner circumferential surface of the other end portion 3a of the first housing 3; and an edge portion 7b formed continuously with an end of the ring portion 7a to project outwardly so as to contact with the other end face of the first housing 3.

It should be noted that a mounting bracket 21 (see FIG. 1) to be mounted on the car body is detachably mounted at the other end portion of the first housing 3. The mounting bracket 21 comprises impact energy absorbing means (which is not illustrated in the figure) for absorbing the impact energy together with the impact energy absorbing rings 6 and 7, the impact energy absorbing protrusions 8 and 9 and the impact energy absorbing member 12, by being destroyed when the first housing 3 is pressed in the axial direction by the action of the impact energy.

Regarding the steering apparatus constructed as above, the first housing 3 and the second housing 5 are engaged with each other via the impact energy absorbing rings 6 and 7 and the impact energy absorbing protrusions 8 and 9 by pressing the first housing 3 in the axial direction in a state where the plate pieces 6b of the first impact energy absorbing ring 6 are engaged with the outer circumferential surface of one end portion 5a of the second housing 5 and the second impact energy absorbing ring 7 is engaged with the inner circumferential surface of the other end portion 3a of the first housing 3, for example. With this engagement, the first impact energy absorbing ring 6 comes in contact with the inner circumferential surface of the first housing 3, the second impact energy absorbing ring 7 comes in contact with the outer circumferential surface of the second housing 5 and the impact energy absorbing protrusions 8 and 9 come in contact with the outer circumferential surface of the second housing 5, thereby generating frictional force at the respective contact parts.

The first impact energy absorbing ring 6 has non-contact pathways 6c. Consequently, when engaging the first housing 3 with the second housing 5, the first and second impact energy absorbing protrusions 8 and 9 can be inserted into the non-contact pathways 6c by pressing the first housing 3 in the axial direction after positioning the second impact energy absorbing protrusion 9 so as to correspond to the non-contact pathways 6c. As a result, the first and second impact energy absorbing protrusions 8 and 9 can be inserted without prevention by the first impact energy absorbing ring 6, and the first and second impact energy absorbing protrusions 8 and 9 can be arranged between the first and second impact energy absorbing rings 6 and 7.

The impact energy, which arises when the driver collides with the steering wheel A in a frontal crash of a car or the like, acts on the impact energy absorbing rings 6 and 7 and the impact energy absorbing protrusions 8 and 9 via the first shaft 1, the ball bearing 2 and the first housing 3. As a result, the first housing 3 moves in the axial direction with respect to the second housing 5 together with the impact energy absorbing ring 7 while absorbing the impact energy with the impact energy absorbing rings 6 and 7 and the impact energy absorbing protrusions 8 and 9. Moreover, the impact energy acts on the impact energy absorbing member 12 via the first shaft 1 and the impact energy absorbing member 12 is destroyed, thereby allowing movement of the first shaft 1.

In this movement, the axial distance between the impact energy absorbing rings 6 and 7 is first lengthened as the first housing 3 moves in the axial direction after a crash. Impact energy is then absorbed in a state where the circumferential surface of the impact energy absorbing rings 6 and 7 the axial distance between which has been lengthened are in contact with the circumferential surface of the first housing 3 and the second housing 5, thereby reducing the load due to frictional resistance applied to the engagement portion satisfactorily and reducing the movement resistance of the first housing 3. Furthermore, since the first and second impact energy absorbing protrusions 8 and 9 are provided between the impact energy absorbing rings 6 and 7, bending moment applied to the first housing 3 in usual steering can be applied in a divided manner to the impact energy absorbing rings 6 and 7 and the impact energy absorbing protrusions 8 and 9. It is therefore possible to reduce the load applied to the impact energy absorbing rings 6 and 7 in usual steering and to improve the durability of the impact energy absorbing rings 6 and 7.

Figure 6:
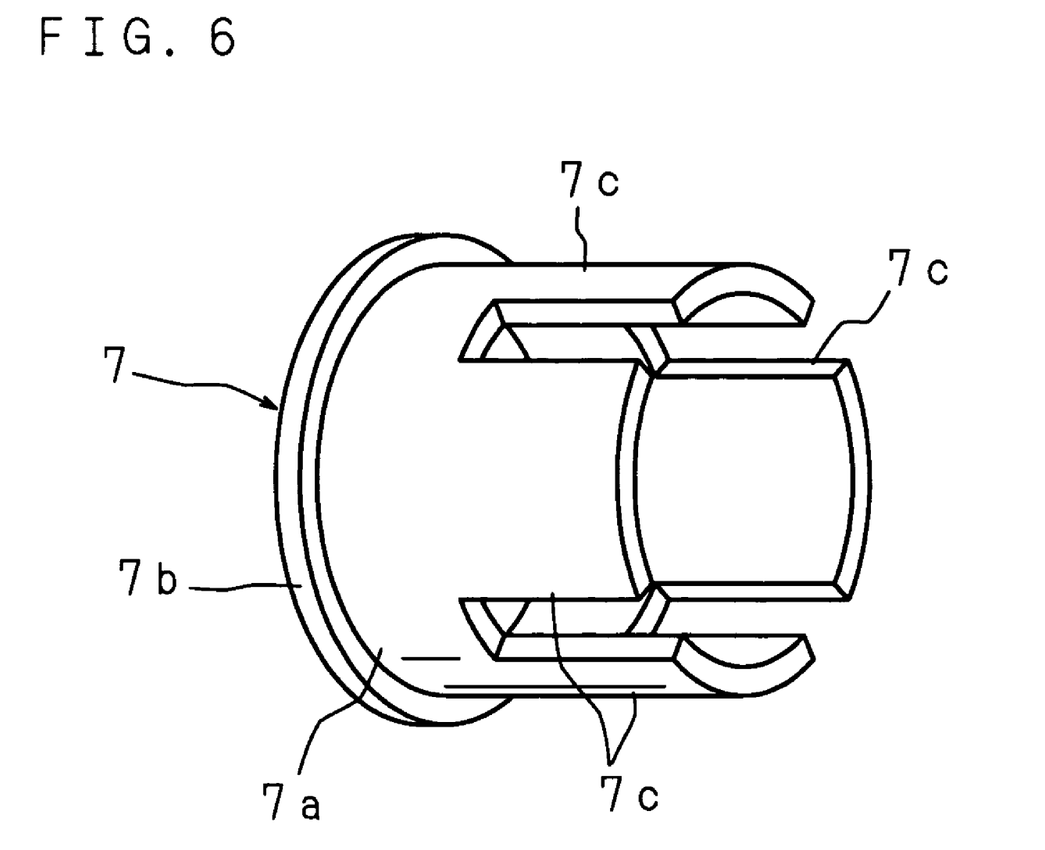
FIG. 6 is a perspective view showing the structure of another second impact energy absorbing ring of the steering apparatus according to the present invention.

FIG. 6 is a perspective view showing the structure of another second impact energy absorbing ring.

In order to enhance the impact energy absorbing effect by the impact energy absorbing rings 6 and 7 in the above-described embodiment without changing the length of the engagement portion and the distance between the impact energy absorbing protrusions 8 and 9, the plate pieces 6b of the first impact energy absorbing ring 6 is formed to have such a length that the plate pieces 6b pass the axial position of the first impact energy absorbing protrusion 8, i.e. such a length that the plate pieces 6b end at positions nearer to the second impact energy absorbing ring 7 than the first impact energy absorbing protrusion 8, and a plurality of plate pieces 7c are projected from an end of the ring portion 7a of the second impact energy absorbing ring 7 opposite to the edge portion 7b separately from each other in the circumferential direction at intervals corresponding to the second impact energy absorbing protrusion 9, for example, so as to increase the contact area between the first housing 3 and the second housing 5. In this case, only one of the first and second impact energy absorbing rings 6 and 7 may be constructed so as to increase the contact area.

Moreover, although the above-described embodiment employs the first and second impact energy absorbing rings 6 and 7 which are made as separate members, the first and second impact energy absorbing rings 6 and 7 may be connected with each other by a connecting piece which is to be destroyed by press force generated when engaging the first housing 3 with the second housing 5. Furthermore, the first and second impact energy absorbing rings 6 and 7 may be constructed in such a manner that the first and second impact energy absorbing rings 6 and 7 are in one body connected with the connecting piece even after engaging the first housing 3 with the second housing 5 and the connecting piece is to be destroyed when absorbing the impact energy.

Figure 7:
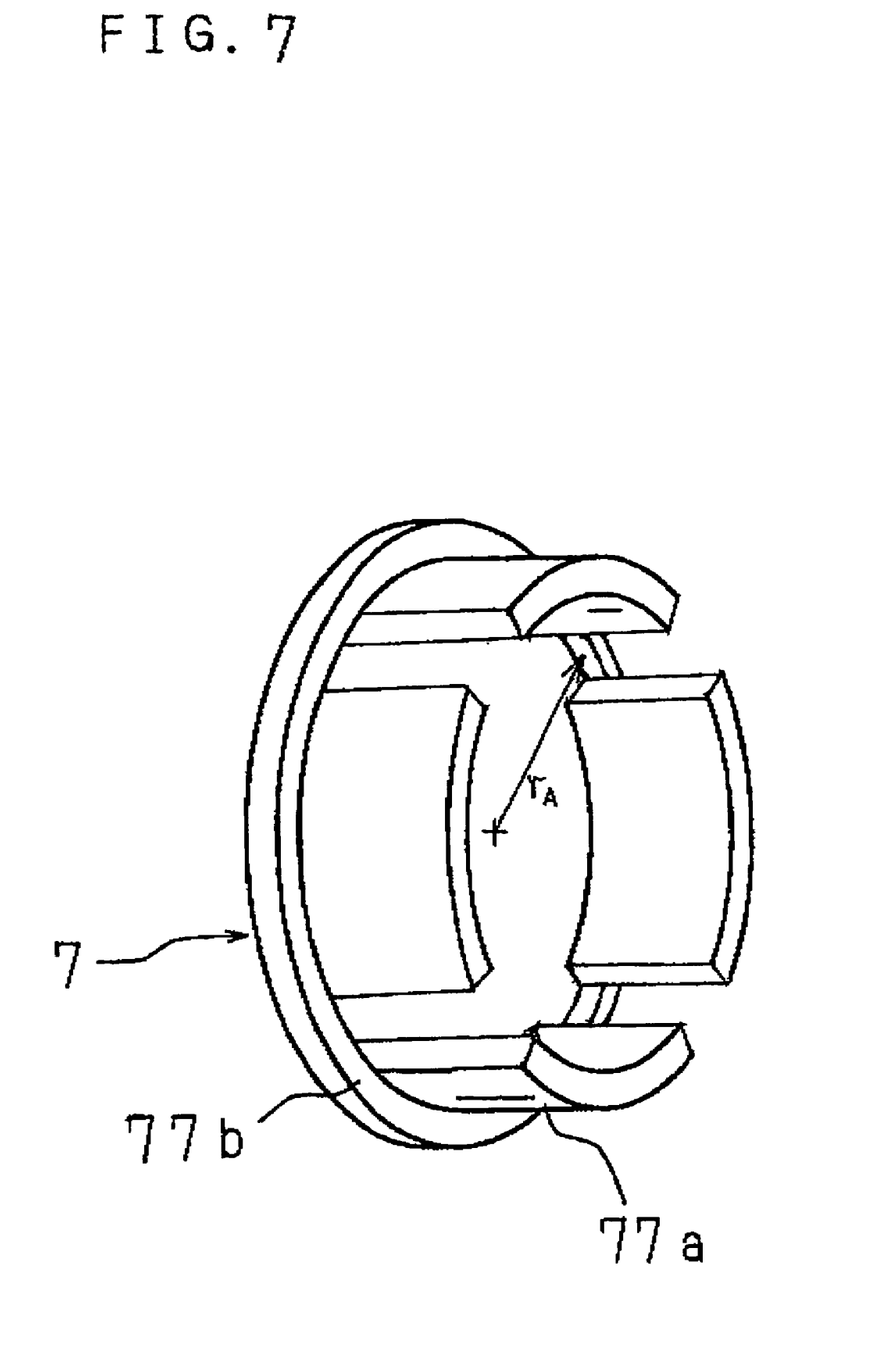
FIG. 7 is a perspective view showing the structure of another second energy absorbing ring of the steering apparatus according to another embodiment of the present invention.

Moreover, although the above-described embodiment employs the impact energy absorbing protrusions 8 and 9 provided at the first housing 3, another embodiment of the present invention provides the impact energy absorbing protrusions 8 and 9 at engagement portions of the second housing 5. FIG. 7 is a perspective view showing the structure of another second energy absorbing ring in such embodiment. As shown in FIG. 7, the second impact energy absorbing ring 7 has a ring portion 77b with a portion having an internal radius $r_A$. The ring portion 77b contacts with the other end face of the first housing 3 and a plurality of plate pieces 77 a formed continuously with the ring portion 77b spaced from each other in the circumferential direction at intervals corresponding to the second impact energy absorbing protrusion 9, so that the space between the plate pieces of the ring portion is used as non-contact pathways which do not contact with the second impact energy absorbing protrusion 9.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A steering apparatus comprising:
   a steering shaft having an end portion coupled to a steering member;
   a first housing for rotatably supporting the steering shaft; and
   a second housing engaged with the first housing via two impact energy absorbing rings separate from each other in an axial direction, the first housing and the second housing being relatively movable in an axial direction, wherein
   one of the first housing and the second housing has a plurality of first impact energy absorbing protrusions and a plurality of second impact energy absorbing protrusions,
   the first and second impact absorbing protrusions are projected from positions between the impact energy absorbing rings separately from each other in the axial direction and are in contact with a circumferential surface of the other of the first housing and the second housing,
   the first impact energy absorbing protrusions are arranged separately from each other in a circumferential direction,
   the second impact energy absorbing protrusions are arranged separately from each other in a circumferential direction,
   one of the impact energy absorbing rings has a ring portion in contact with an end face of one of the first housing and the second housing, and
   a plurality of plate pieces are disposed continuously with the ring portion separately from each other in a circumferential direction at intervals corresponding to the impact energy absorbing protrusions.

2. The steering apparatus according to claim 1, wherein the plurality of plate pieces disposed with the ring portion in the circumferential direction at intervals provide the ring portion with at least one portion where no plate piece is provided, and an external diameter of the at least one portion of the ring portion where no plate piece is provided is equal to or smaller than an external diameter of the second housing an end face of which contacts the ring portion.

3. The steering apparatus according to claim 1, wherein an internal radius of a portion of a ring portion where no plate piece is provided is equal to or larger than an internal radius of the first housing an end face of which contacts the ring portion.

4. The steering apparatus according to claim 1, wherein the plate pieces have such a length that the plate pieces pass an axial position of one of the first and second impact energy absorbing protrusions.

5. The steering apparatus according to claim 1, wherein the other impact energy absorbing ring has:
   another ring portion arranged between the first housing and the second housing;
   an edge portion formed continuously with an end of the other ring portion to project outwardly or inwardly so as to contact an end face of one of the first housing and the second housing; and
   a plurality of other plate pieces projected from an end of the other ring portion opposite the edge portion separately from each other in a circumferential direction at intervals corresponding to the impact energy absorbing protrusions.

6. A steering apparatus comprising:
   a steering shaft having an end portion coupled to a steering member;
   a first housing for rotatably supporting the steering shaft; and
   a second housing engaged with the first housing via two impact energy absorbing rings separate from each other in an axial direction, the first housing and the second housing being relatively movable in an axial direction, wherein one of the first housing and the second housing has a plurality of first impact energy absorbing protrusions and a plurality of second impact energy absorbing protrusions, the first and second impact absorbing protrusions are projected from positions between the impact energy absorbing rings separately from each other in the axial direction and are in contact with a circumferential surface of the other of the first housing and the second housing, the first impact energy absorbing protrusions are arranged separately from each other in a circumferential direction, the second impact energy absorbing protrusions are arranged separately from each other in a circumferential direction, one of the impact energy absorbing rings has a ring portion to contact with an end face of one of the first housing and the second housing, a plurality of plate pieces are disposed continuously with the ring portion spaced from each other in a circumferential direction at intervals providing gaps between the plate pieces and which correspond to the impact energy absorbing protrusions, and one of the impact energy absorbing rings comprises a plurality of recesses aligned with the gaps.

7. The steering apparatus of claim 6, wherein an external diameter of the ring portion where the gaps are provided between the plate pieces is equal to or smaller than an external diameter of the second housing an end face of which contacts the ring portion.

8. A steering apparatus comprising:

a steering shaft having an end portion coupled to a steering member;

a first housing for rotatably supporting the steering shaft; and a second housing engaged with the first housing via two impact energy absorbing rings separate from each other in an axial direction, the first housing and the second housing being relatively movable in an axial direction, wherein one of the first housing and the second housing has a plurality of impact energy absorbing protrusions, the impact absorbing protrusions are projected from positions between the impact energy absorbing rings and are in contact with the circumferential surface of the other of the first housing and the second housing, the impact energy absorbing protrusions are arranged separately from each other in a circumferential direction, one of the impact energy absorbing rings has a ring portion in contact with an end face of one of the first housing and the second housing, and a plurality of plate pieces are disposed continuously with the ring portion separately from each other in a circumferential direction at intervals providing non-contact pathways along the entire length of the one impact energy absorbing ring, the non-contact pathways corresponding to the impact energy absorbing protrusions.

* * * * *